United States Patent
Schmidt (10) Patent No.: US 11,667,323 B2
(45) Date of Patent: Jun. 6, 2023

(54) STEERING COLUMN FOR A MOTOR VEHICLE AND METHOD FOR ASSEMBLY

(71) Applicants: thyssenkrupp Presta AG, Eschen (LI); thyssenkrupp AG, Essen (DE)

(72) Inventor: René Marco Schmidt, Lienz (CH)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 43 days.

(21) Appl. No.: 17/295,711

(22) PCT Filed: Dec. 10, 2019

(86) PCT No.: PCT/EP2019/084389
§ 371 (c)(1),
(2) Date: May 20, 2021

(87) PCT Pub. No.: WO2020/120456
PCT Pub. Date: Jun. 18, 2020

(65) Prior Publication Data
US 2021/0387662 A1 Dec. 16, 2021

(30) Foreign Application Priority Data

Dec. 12, 2018 (DE) ...................... 10 2018 131 918.5

(51) Int. Cl.
*B62D 1/184* (2006.01)
(52) U.S. Cl.
CPC .................................. *B62D 1/184* (2013.01)
(58) Field of Classification Search
CPC .............................. B62D 1/184; B62D 1/185
See application file for complete search history.

(56) References Cited

U.S. PATENT DOCUMENTS

| 9,610,969 B2* | 4/2017 | Oehri | B62D 1/187 |
| 2004/0104566 A1* | 6/2004 | Adoline | B62D 1/184 |
| | | | 280/775 |

(Continued)

FOREIGN PATENT DOCUMENTS

| CN | 103754254 A | 4/2014 |
| CN | 105711637 A | 6/2016 |

(Continued)

OTHER PUBLICATIONS

English Translation of International Search Report issued in PCT/EP2019/084389, dated Mar. 20, 2020.

(Continued)

*Primary Examiner* — James A English
*Assistant Examiner* — Matthew James O'Neill
(74) *Attorney, Agent, or Firm* — thyssenkrupp North America, LLC (57) ABSTRACT

A steering column may include an actuating unit in which a steering shaft is mounted rotatably, a holding unit that is connectable to a body of a motor vehicle and that adjustably supports the actuating unit, a locking element that is coupled movably to the holding unit for axial locking of the actuating unit, a spring element that exerts a prestressing force on the locking element, a securing element for fixing the spring element, and a counterbearing. The locking element, the securing element, and the counterbearing may form a three-point arrangement in which the spring element is fixed. The spring element may be supported on one side on the locking element and on the other side on the counterbearing. The securing element may be arranged between the locking element and the counterbearing and may prestress the spring element.

19 Claims, 4 Drawing Sheets

(56) References Cited

U.S. PATENT DOCUMENTS

2008/0236325 A1   10/2008  Ridgway
2020/0406951 A1*  12/2020  Lingemann ............ B62D 1/187

FOREIGN PATENT DOCUMENTS

| DE | 102014108577 B | 9/2015 |
| DE | 102016210833 A | 12/2017 |
| DE | 102016214709 A | 2/2018 |
| GB | 2311839 A | 10/1997 |
| WO | 2016146331 A | 9/2016 |

OTHER PUBLICATIONS

European Standard ISO 8745, Grooved pins—Half-length taper grooved, Mar. 1998. (English machine translation included).

* cited by examiner

STEERING COLUMN FOR A MOTOR VEHICLE AND METHOD FOR ASSEMBLY

CROSS REFERENCE TO RELATED APPLICATIONS

This application is a U.S. National Stage Entry of International Patent Application Serial Number PCT/EP2019/084389, filed Dec. 10, 2019, which claims priority to German Patent Application No. DE 10 2018 131 918.5, filed Dec. 12, 2018, the entire contents of both of which are incorporated herein by reference.

FIELD

The present disclosure generally relates to steering columns, including motor vehicle steering columns with actuating units.

BACKGROUND

In general, steering columns for motor vehicles are known, in the case of which steering columns a steering wheel position can be adapted to the seating position of the driver of a motor vehicle. To this end, the steering column has a steering spindle, to which a steering wheel is fastened. Here, the steering column can be adjusted substantially in such a way that the steering wheel can be positioned in the vehicle interior compartment by way of a longitudinal adjustment in the longitudinal direction of the steering column. In order to fix the steering spindle with the steering wheel at the desired position, the steering column has a clamping device.

A steering column with a clamping device is known, for example, from DE 10 2016 214 709 A1 which was mentioned at the outset. Here, the steering column comprises a casing unit and an inner casing tube, in which a steering spindle is mounted rotatably. The inner casing tube can be adjusted telescopically in the direction of the longitudinal axis of the steering spindle, and can be fixed in different steering wheel positions by means of a releasable clamping device. The casing unit is secured on the body of the motor vehicle.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In some examples, a steering column may include an actuating unit, in which a steering shaft is mounted rotatably, a holding unit which can be connected to the body of the motor vehicle and supports the actuating unit, it being possible for the actuating unit to be adjusted relative to the holding unit, at least one locking element which is coupled movably to the holding unit for axial locking of the actuating unit, at least one spring element which exerts a prestressing force on the locking element, and at least one securing element for fixing of the spring element. Furthermore, the present disclosure generally relates to methods for mounting.

The clamping device which is known from DE 10 2016 214 709 A1 has a locking element which can be connected in a positively locking manner to an engagement part and is arranged displaceably in the casing unit. The engagement part is coupled to the inner casing tube. Furthermore, the clamping device has a cam and a clamping bolt which is mounted rotatably in the casing unit. Here, the cam is connected to the clamping bolt in such a way that the clamping bolt interacts with the locking element by way of a rotational movement. The locking element is raised or lowered by way of the rotational movement of the cam. In the release position, the locking element and the engagement element are decoupled from one another. The locking element has a cam track for raising or lowering the locking element. Here, the cam interacts with the cam track of the locking element in order to fix or release the steering spindle.

In order to prestress the locking element, the clamping device has a spring element which acts on the locking element. Here, the spring element is arranged in a mount in such a way that the spring element is connected fixedly with its free end to the mount.

It is a disadvantage of the clamping device previously known from DE 10 2016 214 709 A1 that the connection of the spring element to the mount is complicated, since a thread is cut into the mount and the spring element is screwed to the mount. This represents an increased manufacturing and assembly complexity.

Thus, a need exists for a steering column with an improved clamping device that is simple, inexpensive, and easy to assemble.

Specifically, the object is achieved by way of a steering column for a motor vehicle, which steering column comprises an actuating unit, in which a steering shaft is mounted rotatably. The steering column comprises a holding unit which can be connected to the body of the motor vehicle and supports the actuating unit, it being possible for the actuating unit to be adjusted relative to the holding unit. The steering column has at least one locking element which is coupled movably to the holding unit for axial locking of the actuating unit, and at least one spring element which exerts a prestressing force on the locking element. Furthermore, the steering column comprises at least one securing element for fixing of the spring element, the locking element, the securing element and a counterbearing forming a three-point arrangement, in which the spring element is positioned and fixed. Here, the spring element is supported on one side on the locking element and on the other side on the counterbearing. A securing element which prestresses the spring element is arranged between the locking element and the counterbearing.

The invention has the advantage that this is a self-securing system, in the case of which the securing element fulfills a dual function. Both the prestressing and the securing or fixing of the spring element take place by way of the securing element. Therefore, no additional screwing or riveting operation is required in order to prestress or fix the spring element.

Here, the counterbearing forms a first point, in particular a first bearing point or a first holding point of the three-point arrangement. The locking element forms a second point, in particular a second bearing point or a second holding point of the three-point arrangement. The securing element forms a third point, in particular a third bearing point or a third holding point of the three-point arrangement.

Figure 7:
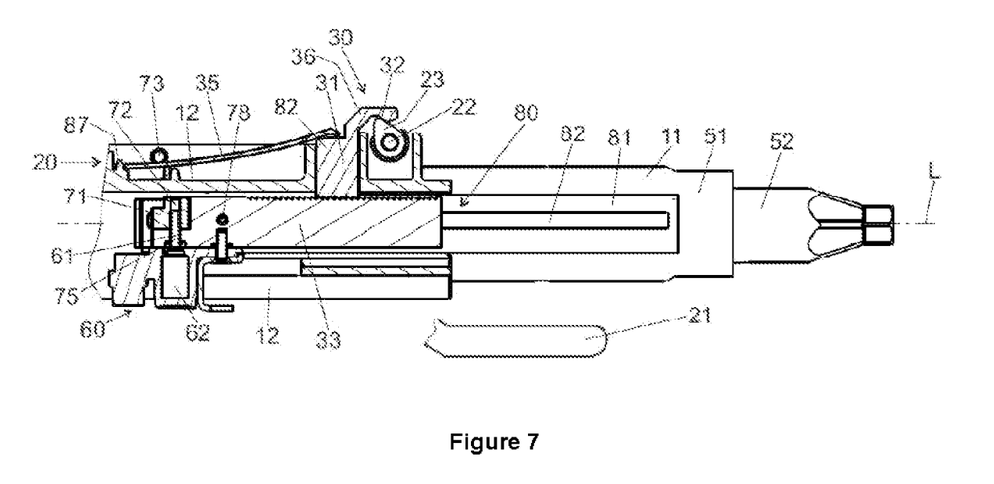
FIG. 7 is a side view of the steering column according to FIG. 5 with the clamping device and a fixing device in a fixing position of the locking element.

The securing element or generally the third point of the three-point arrangement is arranged between the locking element and the counterbearing, that is to say between the second and the first point of the three-point arrangement. The locking element and the counterbearing, that is to say the second and the first point of the three-point arrangement, form a line. The securing element or generally the third point of the three-point arrangement is arranged on a perpendicular which intersects said line, to be precise between the locking element and the counterbearing, that is to say between the second and the first point of the three-point arrangement. Specifically, at least the contact line of the securing element with the spring element lies outside the line between the locking element and the counterbearing, that is to say between the second and the first point of the three-point arrangement. In FIG. 7, the contact line of the securing element with the spring element is arranged below the line between the locking element and the counterbearing. Another arrangement is possible depending on the installation position of the spring element. This achieves a situation where, for example in the case of a straight spring element, the latter is deflected in order to produce the prestressing force.

The securing element or generally the third point of the three-point arrangement can be arranged directly on the line, for example when the spring element is curved in the rest position.

Moreover, the counterbearing, in particular the counterbearing and the locking element on one side and the securing element on the other side, are preferably arranged on opposite sides of the spring element in the mounted state. In other words, the spring element is arranged, in particular clamped in, between the securing element on one side and the counterbearing and the locking element on the other side.

The above-described position of the three points brings it about that the spring element can be clamped or is clamped into the three-point arrangement in such a way that a prestressing force acts on the locking element, which prestressing force forces the locking element into the locking position. The three-point arrangement and the spring element interact in such a way that, in the clamped-in-state, the spring element is deflected out of the rest position and is fixed in the deflected state. The spring element is elastically deformed in the deflected state.

In the rest state, the spring element can be, for example, of straight configuration. The three-point arrangement then necessitates a bending line of the spring element, along which bending line the spring element is deformed in the clamped-in-state. In the deformed state, the spring element can be continuously curved. The position of the three points (the locking element, the counterbearing and the securing element) relative to one another determines the bending line of the spring element and therefore the spring force which acts on the locking element.

It is also possible that the spring element is curved in the rest state and is stretched at least partially in the clamped-in-state in the three-point arrangement. Here, the three-point arrangement and the spring element also interact in such a way that the locking element is loaded with a prestressing force.

Generally, the spring element can be configured as a leaf spring, that is to say as a flat, leaf-shaped spring. The spring element can be formed, for example, by way of a spring tongue which tapers at one end. The spring tongue has, in particular, a trapezoidal shape, the base bearing against the counterbearing, and the side which is arranged opposite in parallel or that end of the spring tongue which is arranged opposite in parallel bearing against the locking element. The base and the side which is arranged opposite in parallel form the basic sides of the trapezoidal spring tongue. The base is longer than the end or the side which is arranged opposite in parallel.

Other shapes of the spring element are possible.

For mounting purposes, the spring element can be deflected with the aid of a mounting tool and can be positioned in the three-point arrangement, for example by way of being pushed in. It is also possible for the spring element to be positioned and deflected on the locking element and the counterbearing, with the result that the securing element can be inserted into the holding unit, in order to secure and to fix the spring element in the prestressed state.

The adjustment of the required prestressing force on the locking element takes place here by way of the spacing between the locking element and the spring element as well as between the securing element and the spring element.

In the mounted state, the locking element is prestressed against the engagement element by way of the spring element. The spring element therefore brings about a prestress of the locking element in the direction of the engagement element. As a result, a reliable engagement of the locking element into the engagement element is made possible. In other words, the locking element can be transferred into the fixing position or locking position by way of the spring element. The spring element prestresses the locking element in such a way that a reliable closure of the clamping lever and therefore a reliable transfer of the locking element into the fixing position are achieved.

Preferred embodiments of the invention are specified in the subclaims.

In one preferred embodiment, the steering column has at least one clamping shaft which is connected fixedly to a cam so as to rotate with it, which cam actuates the locking element in order to release or lock the actuating unit. Here, the clamping shaft can be coupled to a lever and a clamping apparatus, the clamping apparatus being positioned between a release position and a fixing position. The coupling has the advantage that the clamping apparatus can be configured, for example, as a compact cam clamping apparatus or gravity lock clamping apparatus.

In one preferred embodiment, the securing element can be configured as a pin-like component which is connected fixedly to the holding unit. This connecting form entails the advantage that it is simpler and less expensive in comparison with the fixing by means of a screw. For example, cylindrical pins with a round, circular-cylindrical or any desired cross section can be used. Furthermore, the securing element can also be configured as a splint, as a pin with two locating sections, or as a locating dowel pin in accordance with ISO 8745.

In one advantageous development, the fixed connection of the securing element in the holding unit can be realized by virtue of the fact that the spring element loads the securing element with a force in the radial direction, that is to say in a direction orthogonally with respect to the longitudinal extent axis of the securing element, in such a way that said securing element is held on the holding unit in a non-positive manner. In other words, the securing element is held in the holding unit against falling out in the direction of the longitudinal extent axis by way of the prestressing force of the spring element.

As an alternative or in addition, the securing element can be pressed into an opening of the holding unit. In the case of this type, an oversize fit can be provided between the securing element and the opening.

In a further preferred embodiment, the securing element is inserted into the holding unit in a direction which is inserted into the holding unit in an angular, in particular orthogonal, manner with respect to the longitudinal axis of the spring element. Here, the deflection direction denotes the direction which is directed orthogonally with respect to the longitudinal position of the spring element and into the holding unit. This type of arrangement of the securing element has the advantage that a very satisfactory transmission of force to the spring element is made possible.

In order to avoid double fits, the holding unit preferably has a first and a second opening, the diameters of the two openings being adapted so as to correspond to the diameter of the securing element, one of the two openings having a smaller diameter.

The securing element is preferably pressed into one of the two openings of the holding unit. This makes inexpensive and rapid mounting possible.

In one preferred embodiment, the spring element has a projection which engages into a lateral cutout of the holding unit. As a result, it is avoided that the spring element is inserted the wrong way around during mounting.

For exact positioning of the spring element, the counter-bearing in a further preferred embodiment has a positioning element which engages into a corresponding structure of the spring element.

In one preferred embodiment, the securing element has a knurled portion, in particular a longitudinal knurled portion with a multiplicity of teeth. Therefore, relatively low press-in forces are required during mounting. Furthermore, the knurled portion affords increased security against rotation.

A further independent aspect of the invention relates to a method for mounting a spring element into a steering column in accordance with the preamble of patent claim 1, in the case of which method the spring element is positioned within a three-point arrangement and is prestressed with a mounting force, the securing element subsequently being connected fixedly to the holding unit, in order to fix the spring element in the prestressed state. With respect to the advantages of the method according to the invention, reference is made to the comments in respect of patent claim 1.

The fixed connection of the securing element in the holding unit can be realized by virtue of the fact that the spring element loads the securing element with a force in the radial direction, that is to say in a direction orthogonally with respect to the longitudinal extent axis of the securing element, in such a way that said securing element is held in a non-positive manner on the holding unit.

As an alternative or in addition, the securing element can be pressed into an opening of the holding unit. In a case of this type, an oversize fit can be provided between the securing element and the opening.

Figure 1:
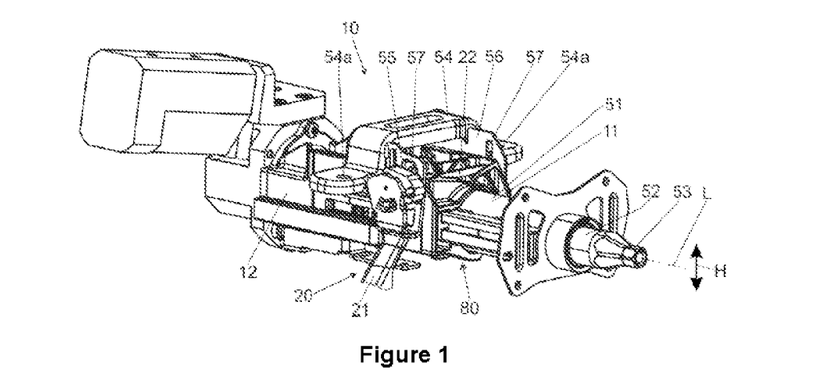
FIG. 1 is a perspective view of a steering column with a holding element for the general description of the construction of a steering column.

FIG. 1 shows a perspective view of a steering column 10 for the explanation of the installation situation of the relevant components. The general installation situation is also disclosed in conjunction with the exemplary embodiment according to the invention in accordance with FIGS. 5-13. The steering column 10 comprises an actuating unit 11, a holding unit 12 and a clamping device 20. The steering column 10 can be fastened by way of the holding unit 12 to a body of a motor vehicle (not shown). The holding unit 12 has a holding element 54 in the form of a bracket, by way of which the steering column 10 can be connected to the body of the motor vehicle. The holding element 54 comprises fastening means 54a for the connection to the vehicle body. Furthermore, the holding element 54 has side cheeks 55, 56 which are spaced apart from one another. Here, the side cheeks 55, 56 are arranged with respect to one another in such a way that the holding unit 12 is received between the side cheeks 55, 56. The actuating unit 11 is arranged in the holding unit 12.

The actuating unit 11 comprises a steering spindle 52 and a casing tube 51. The steering spindle 52 and the casing tube 51 have a common longitudinal axis L. Here, the steering spindle 52 is arranged mounted in the casing tube 51 such that it can be rotated about the longitudinal axis L. The steering spindle 52 has a rear end 53, at which a steering wheel (not shown) can be attached to the steering spindle 52. The casing tube 51 is secured in a receptacle of the holding unit 12.

Figure 2:
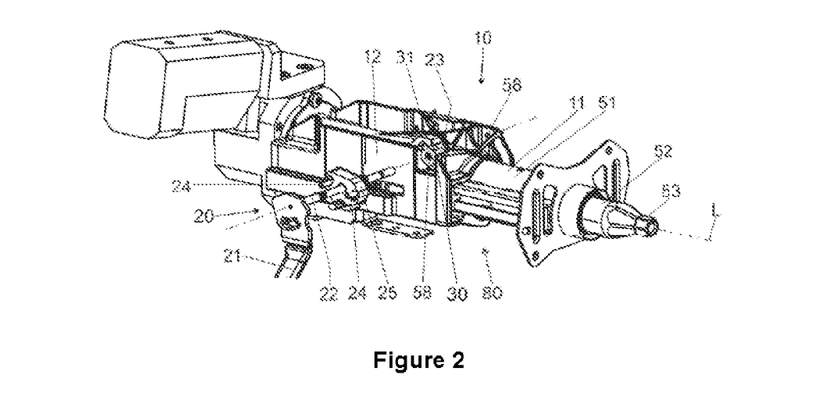
FIG. 2 is a perspective view of the steering column according to FIG. 1 without the holding element.

As shown in FIG. 2, the clamping device 20 has a clamping lever 21, a clamping shaft 22 and a cam 23. The clamping lever 21 is connected fixedly to the clamping shaft 22 so as to rotate with it. The clamping shaft 22 is guided transversely with respect to the longitudinal axis L through slots 57 in the side cheeks 55, 56 which lie opposite one another and through a passage opening of the holding unit 12. Here, the clamping device 20 comprises a generally known clamping mechanism with a gravity lock arrangement 24 and a supporting disk 25.

The gravity lock arrangement 24 is connected fixedly to the clamping shaft 22 so as to rotate with it. Furthermore, the supporting disk 25 of the gravity lock arrangement 24 is fixedly connected, in a manner which lies opposite, to the side cheek 55 so as to rotate with it. By way of a rotation of the clamping lever 21 and the clamping shaft 22 which is connected to it, the supporting disk 25 is moved axially relative to the clamping lever 21 and the clamping shaft 22. As a result, the supporting disk 25 is pressed from the outside against the side cheek 55. The clamping shaft 22 is mounted fixedly against axial displacement on the side cheek 56 which is arranged opposite, for example by way of a hexagon nut which acts as an abutment, has an internal thread, and is screwed onto an external thread of the clamping shaft 22. Therefore, if the two side cheeks 55, 56 are moved against one another, the holding unit 12 which is arranged in between is clamped fixedly in a non-positive manner. Instead of the gravity lock arrangement 24, 25 which is shown, other mechanisms for the conversion of the rotational movement into a clamping movement can also be used, such as, for example, a wedge plate/cam plate clamping apparatus.

Figure 3:
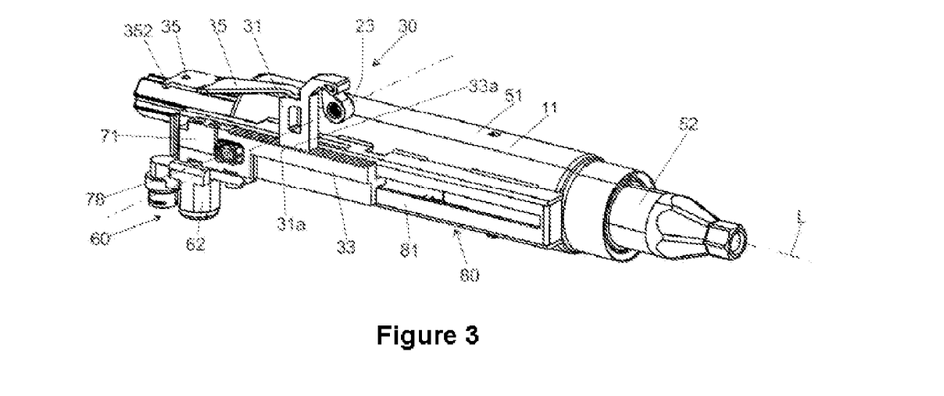
FIG. 3 is a perspective view of an actuating unit, a clamping device, and a fixing device of the steering column according to FIG. 1.

According to FIG. 3, a perspective view of an actuating unit 11, as described above, is shown. Furthermore, FIG. 3 shows a fixing device 30, a coupling apparatus 60 and an energy absorption device 80.

The fixing device 30 has a locking element 31 and an engagement element 33. The locking element 31 is mounted fixedly such that it cannot be displaced in the direction of the longitudinal axis L in the holding unit 12. In the vertical direction H, the locking element 31 is mounted such that it can be adjusted vertically in order to set the fixing position or the release position of the clamping lever 21. In other words, the locking element 31 is arranged in the holding unit 12 in such a way that the locking element 31 can be displaced in the vertical direction H in the holding unit 12. The engagement element 33 is connected via an energy absorption device 80 to the casing tube 51. The locking element 31 and the engagement element 33 have positively locking means 31a, 33a. The positively locking means 31a, 33a can be brought into engagement in a positively locking manner by way of a stroke movement of the locking element 31.

Figure 4:
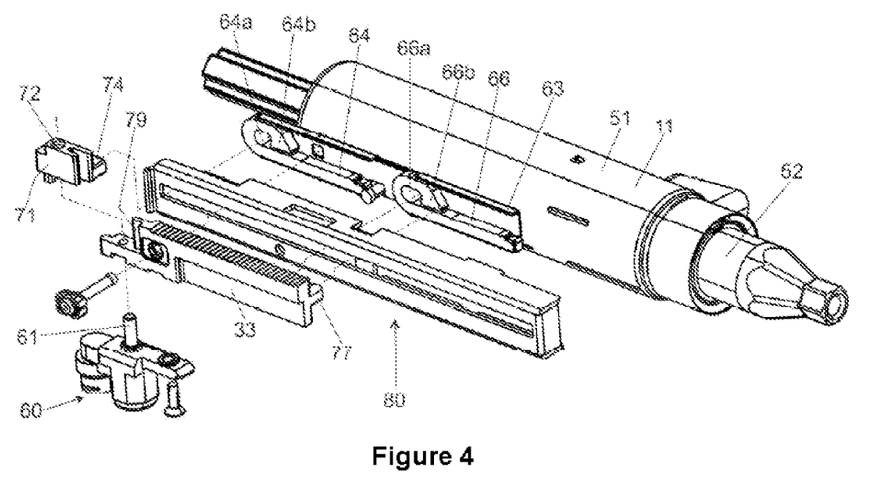
FIG. 4 is a perspective exploded view of the actuating unit and an energy absorption device of the steering column according to FIG. 1.

In FIG. 4, the engagement element 33 has a connecting part 71. The connecting part 71 forms a separate part which is connected by way of a coupling apparatus 60 to the engagement element 33. To this end, a bolt 61 of the coupling apparatus 60 engages into a bore 72 of the connecting part 71. The coupling apparatus 60 is connected fixedly to the engagement element 33. The actuation of the coupling apparatus 60 makes a release of the mechanical connection between the engagement element 33 and the connecting part 71 possible, by a bolt 61 of the coupling apparatus 60 being transferred from an extended position into a withdrawn position by means of a pyrotechnic propellant. Here, the connecting element 71 is disconnected from the engagement element 33, it being possible for the connecting part 71 and the engagement element 33 to be moved in the longitudinal direction L independently of one another.

As shown in FIG. 4, energy absorption elements 64, 66 are arranged spaced apart from one another in the inner profile 63. Here, the energy absorption elements 64, 66 are configured in each case as a U-shaped bending wire, in particular bending strip. The respective energy absorption element 64, 66 is connected with a first limb via a bend of 180° to a second limb. At the end of the second limb, in each case one driver hook 64b, 66b is configured by way of a bend against the first limb. The energy absorption elements 64, 66 can be configured as stamped parts. The connecting part 71 has a pin 74 which is in active engagement with the driver hook 64b and engages into the eyelet-shaped recess 64a which is formed by way of the bend and the driver hooks 64b. The engagement element 33 has a pin 77 which is in active engagement with the driver hook 66b and engages into the eyelet-shaped recess 66a which is formed by way of the bend and the driver hooks 66b.

In a first crash case, in which the engagement element 33 is coupled to the connecting element 71, the two energy absorption elements 64, 66 are deformed at the same time in order to provide a high crash level. In a second crash case, in which the engagement element 33 is decoupled from the connecting element 71, only the energy absorption element 66 is deformed, and the energy absorption element 64 remains undeformed in order to provide a lower crash level.

Figure 5:
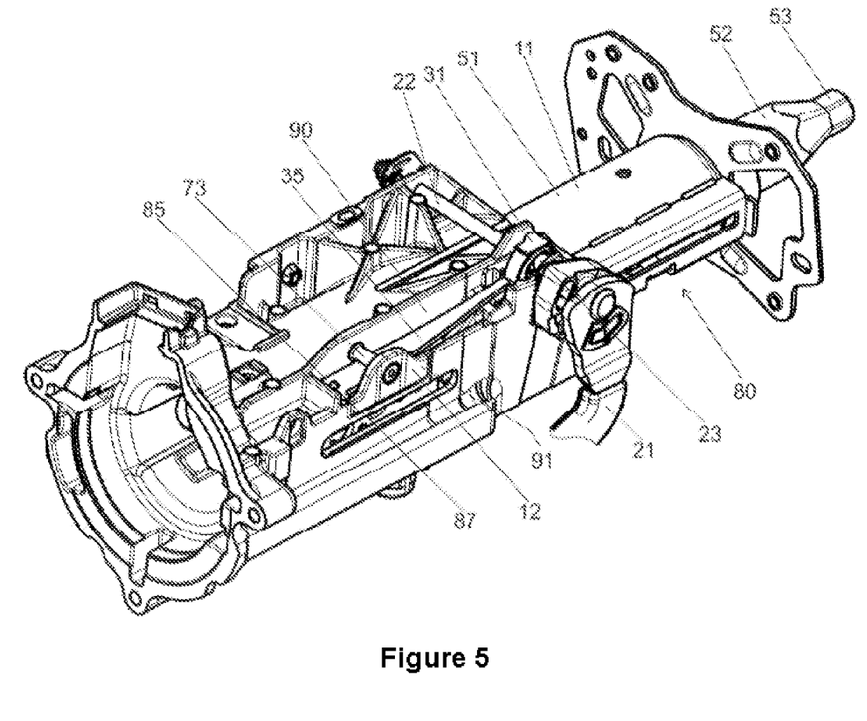
FIG. 5 is a perspective view of an example steering column in an assembled state.

FIG. 5 shows a perspective view of the steering column 10 in the assembled state in accordance with one exemplary embodiment according to the invention. The components which are described in conjunction with FIGS. 1-4 are likewise installed in the case of the steering column 10 according to FIG. 5. In this regard, reference is made to the above comments.

Figure 6:
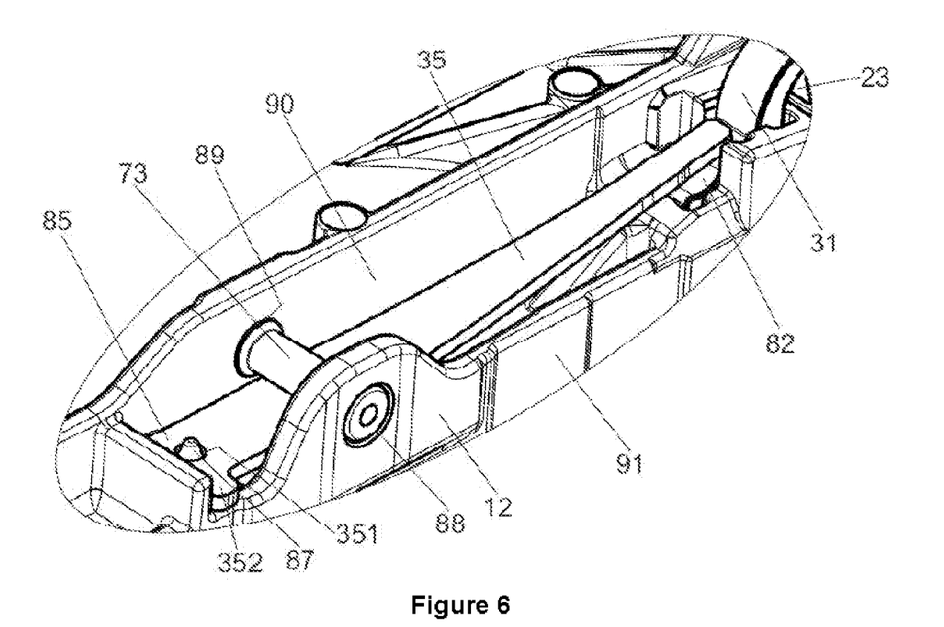
FIG. 6 is a detail view of a clamping device according to FIG. 5.

FIG. 6 depicts a detailed view of the clamping device 20 according to FIG. 5. For the prestress of the locking element 31, the holding unit 12 has a spring element 35 which presses the locking element 31 against the engagement element 33.

The spring element 35 is configured as a leaf spring, in particular as a spring tongue with an elongate overall design. In respect of the details of the spring tongue, reference is made to the introduction of the description. That end of the spring tongue or the spring element 35 which is arranged opposite the base acts on the locking element 31, in particular on a supporting section 82 which is described in greater detail in the following text. To this end, the end has a bent-over section which bears in a linear manner against the supporting section 82 or in general against the locking element 31.

In the region of the base, that is to say close to the counterbearing 85, the spring element 35 has a projection which engages into a lateral cutout of the holding unit 12, in order to avoid incorrect mounting.

The spring element 35 can be formed from spring steel or another material.

The spring element 35 is curved in the clamped-in state.

The spring element 35 is arranged in a three-point arrangement which is formed from the locking element 31, a securing element 73 and a counterbearing 85. The spring element 35 is supported on one side on the supporting section 82 which is part of the locking element 31 and on the other side on the counterbearing 85. The supporting section 82 forms a first step with a straight rest face for the one end of the spring element 35. The first step is configured on that side of the locking element 31 which is arranged opposite the engagement element 33. The counterbearing 85 forms a second step or shoulder, into which the base, that is to say the other end of the spring element 35, is fitted. In other words, the counterbearing 85 mounts the spring element in the axial direction, that is to say in a direction along the longitudinal axis of the spring element 35, in order to avoid a displacement of the spring element 35. In addition, the counterbearing 85 mounts the spring element 35 in the transverse direction, that is to say in a direction transversely with respect to the longitudinal axis of the spring element 35, in order to introduce the prestressing force into the holding unit 12.

The securing element 73 is arranged on the side of the spring element 35 in a manner which is opposed with respect to the counterbearing 85 and the locking element 31, and deflects the spring element 35.

The three-point arrangement can be considered to be a bearing system of the spring element 35 at three positions, which bearing system makes a continuous deflection of the spring element 35 possible (FIG. 7).

The holding element 12 comprises two side walls 90 and 91 which are arranged in parallel, the side wall 91 having a projection 92. The side walls 90 and 91 have two openings 88, 89. The securing element 73 is arranged in the two side walls 90 and 91 between the locking element 31 and the counterbearing 85 in such a way that the securing element 73 is situated here above the spring element 35 and prestresses or fixes the spring element 73. Here, the securing element 73 is inserted into the two openings 88, 89 at an angle, in particular orthogonally with respect to the longitudinal axis of the spring element 35. The orthogonal arrangement of the securing element 73 makes a satisfactory transmission of force and simple mounting possible.

A conical positioning element 87 engages into a corresponding structure of the spring element 35, in order to position the spring element 35 exactly within the three-point arrangement. The positioning element 87 is situated in the region of the counterbearing 85 and protrudes through an opening 351 of the spring element 35.

The spring element 35 has a projection 352 which engages into a recess of the holding unit 12, the projection being arranged asymmetrically on the spring element 35 in such a way that the spring element 35 can be mounted on the holding unit 12 merely in a single position. In this way, an incorrect installation can be prevented in a simple way.

According to FIG. 7, the locking element 31 and the engagement element 33 are in engagement in a positively locking manner. Here, the fixing position of the locking element 31 corresponds to the fixing position of the clamping device 20. In the fixing position of the locking element 31, the locking element 31 is connected to the engagement element 33 fixedly in terms of displacement in the direction of the longitudinal axis L, in particular in a positively locking manner. In the release position of the clamping device 20, the locking element 31 is decoupled from the engagement element 33, which corresponds to a detached position of the locking element 31. A prestressing force is exerted on the locking element 31 by way of the spring element 35. By way of the rotation of the clamping lever 21, the cam 23 interacts with a slotted guide track 32 in such a way that the locking element 31 is raised or lowered transversely with respect to the longitudinal axis L.

Figure 8:
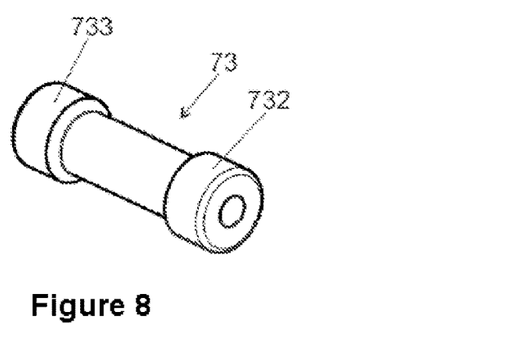
FIG. 8 is a perspective view of a securing element configured as a pin with two locating sections.

FIGS. 8-12 show various exemplary embodiments of the securing element 73 as pin-like components. FIG. 8 illustrates the securing element 73 as a pin with two locating sections. The first locating section 732 preferably has a smaller diameter than the second locating section 733. As a result, a double fit can be avoided effectively, with the result that simple mounting in the corresponding openings 88, 89 of the side walls 90, 91 is made possible.

Figure 9:
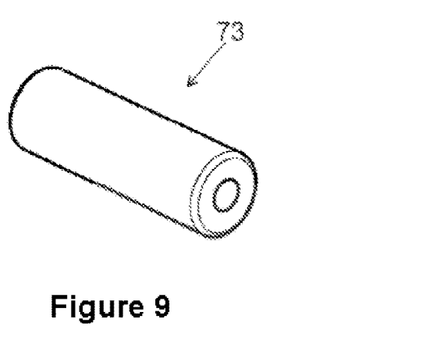
FIG. 9 is a perspective view of a securing element configured as a bolt.

FIG. 9 shows the securing element 73 as a bolt. Said bolt has a constant diameter over its length.

Figure 10:
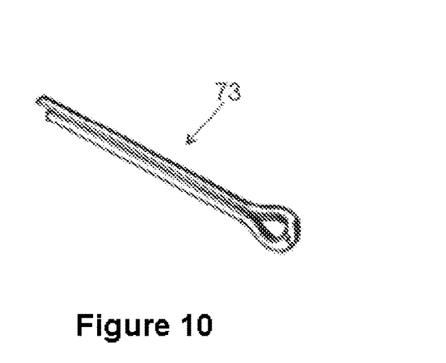
FIG. 10 is a perspective view of a securing element configured as a splint.

Furthermore, it is possible that the securing element 73 is configured as a splint, as in FIG. 10.

Figure 11:
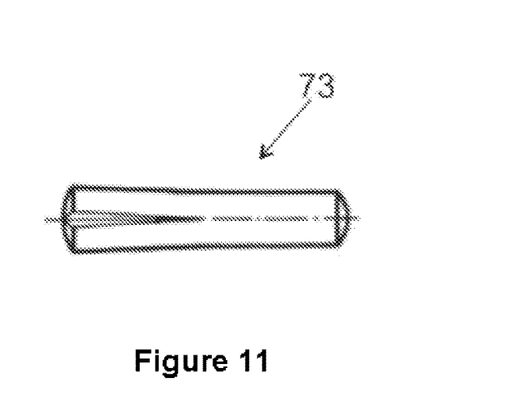
FIG. 11 is a perspective view of a securing element configured as a locating dowel pin.

In a further embodiment, the securing element 73 can be configured as a locating dowel pin, as in FIG. 11. Thanks to the configuration of the securing element 73 as a locating dowel pin, secure fixing can be realized in the direction of the locating dowel pin axis in the openings of the side walls 90, 91 of the holding unit 12, with the result that falling out of the openings can be avoided even in the case of pronounced vibrations.

Figure 12:
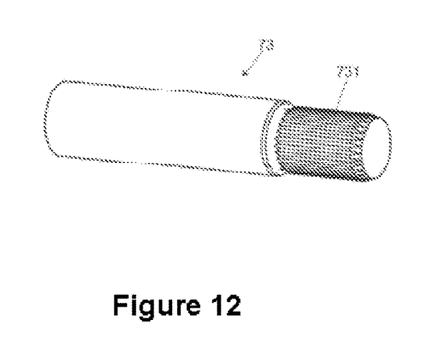
FIG. 12 is a perspective view of a securing element configured as a pin with a longitudinal knurled portion.
Figure 13:
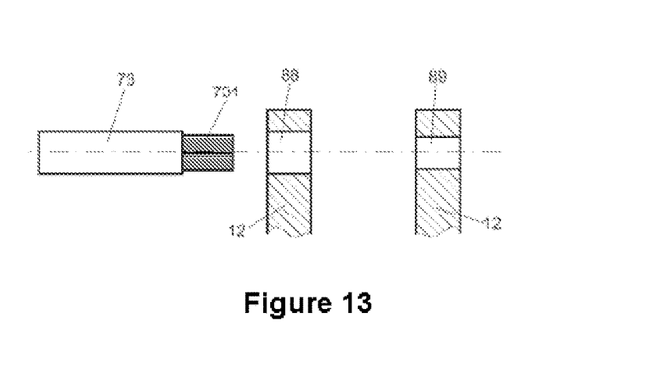
FIG. 13 is a perspective view of a securing element before being pressed into two openings of a holding unit.

FIGS. 12 and 13 show the securing element 73 as a pin with a knurled portion 731, in particular a longitudinal knurled portion. Here, FIG. 13 shows the securing element 73 before the press-in operation into the holding unit 12. Here, the diameters of the two openings 88 and 89 are adapted to the diameter of the securing element 73, in order to avoid double fits, the opening 89 having a small diameter.

The opening 89, into which the securing element 73 is joined last, preferably has a smaller diameter than the opening 88, into which the securing element 73 is introduced first of all.

In general, a securing element 73 can be improved in all design variants by virtue of the fact that that end of the securing element 73 which is introduced first of all into the openings of the holding unit 12 has an insertion bevel. As a result, tilting of the securing element 73 during joining can be avoided effectively.

What is claimed is:

1. A steering column fora motor vehicle, the steering column comprising: an actuating unit in which a steering shaft is rotatably mounted; a holding unit that is connectable to a body of the motor vehicle and that supports the actuating unit, wherein the actuating unit is adjustable relative to the holding unit; a locking element that is coupled movably to the holding unit for axial locking of the actuating unit; a spring element that exerts a prestressing force on the locking element; a securing element for fixing the spring element; and a counterbearing, wherein the locking element, the securing element, and the counterbearing form a three-point arrangement in which the spring element is fixed, wherein the spring element is supported on a first side on the locking element and on a second side on the counterbearing, wherein the securing element is disposed between the locking element and the counterbearing and prestresses the spring element, such that a first planar side of the spring element is supported by the securing element, and such that a second planar side of the spring element that is opposite the first planar side is supported by the locking element and by the counterbearing, wherein the spring element is spaced a part from a clamping shaft that is configured to actuate the locking element to release or lock the actuating unit relative to the holding unit.

2. The steering column of claim 1 wherein the clamping shaft is fixedly connected to a cam so as to rotate with the cam, wherein the cam actuates the locking element to release or lock the actuating unit.

3. The steering column of claim 1 wherein the securing element is configured as a pin-like component that is fixedly and directly connected to the holding unit.

4. The steering column of claim 1 wherein the securing element is disposed orthogonally relative to a longitudinal axis of the spring element, with the securing element being disposed on the first planar side of the spring element, with the second planar side of the spring element that is opposite the first side being free of any other spring element.

5. The steering column of claim 1 wherein the securing element is disposed obliquely relative to a longitudinal axis of the spring element.

6. The steering column of claim 1 wherein the holding unit includes a first opening and a second opening, wherein diameters of the first and second openings are adapted to correspond to a diameter of the securing element, with the diameters of the first and second openings being unequal.

7. The steering column of claim 1 wherein the spring element includes a projection that engages into a cutout of the holding unit.

8. The steering column of claim 1 wherein the counterbearing includes a positioning element that engages a corresponding structure of the spring element to fix the position of the spring element.

9. The steering column of claim 1 wherein the securing element includes a knurled portion.

10. A method for mounting the spring element into the steering column of claim 1, wherein the method comprises: positioning the spring element within the three-point arrangement; prestressing the spring element with a mounting force; subsequently fixedly connecting the securing element to the holding unit to fix the spring element in a prestressed state such that the second planar side of the spring element is supported by the locking element and by the counterbearing and such that the first planar side of the spring element that is opposite the second planar side is supported by the securing element.

11. The steering column of claim 1 wherein the securing element is in direct contact with the first planar side of the spring element.

12. The steering column of claim 1 wherein the spring element is a leaf spring that is free of coils.

13. The steering column of claim 1 wherein the steering shaft is rotatable about a common longitudinal axis, wherein the clamping shaft extends along a lateral axis through the holding unit, with the lateral axis being perpendicular to the common longitudinal axis, wherein the locking element is coupled movably to the holding unit such that the locking element is movable in a direction that is perpendicular to both the common longitudinal axis and the lateral axis.

14. A steering column comprising: an actuating unit in which a steering shaft is rotatably mounted; a holding unit that is connectable to a body of a motor vehicle and supports the actuating unit, wherein the actuating unit is adjustable relative to the holding unit; a locking element that is coupled movably to the holding unit for axial locking of the actuating unit; a spring element that exerts a prestressing force on the locking element; a securing element for fixing the spring element; and a counterbearing, wherein the locking element, the securing element, and the counterbearing form an arrangement in which the spring element is fixed, wherein the securing element prestresses the spring element, wherein the spring element is supported on a first planar face by the securing element, wherein on a second planar face that is opposite the first planar face the spring element is supported on the locking element and by the counterbearing, wherein the securing element is in direct contact with the first planar face of the spring element.

15. The steering column of claim 14 wherein a main extent of the spring element extends longitudinally, wherein the counterbearing is disposed at a first longitudinal end of the spring element, wherein the locking element is disposed at a second longitudinal end of the spring element that is opposite the first longitudinal end, wherein the securing element is disposed along the spring element at a location between the first and second longitudinal ends.

16. The steering column of claim 14 wherein, once assembled in the steering column, the spring element is pinned in an elastically-deformed state between the counterbearing, the securing element, and the locking element.

17. The steering column of claim 14 wherein the steering shaft is rotatable about a common longitudinal axis, wherein a clamping shaft extends along a lateral axis through the holding unit, with the lateral axis being perpendicular to the common longitudinal axis, wherein the locking element is coupled movably to the holding unit such that the locking element is movable in a direction that is perpendicular to both the common longitudinal axis and the lateral axis.

18. The steering column of claim 14 wherein the spring element tapers from an end that is supported by the counterbearing to an end that is engaged with the locking element.

19. The steering column of claim 14 wherein the securing element is rotatably fixed relative to the holding unit such that the securing element cannot rotate relative to the holding unit.

* * * * *